(12) United States Patent
Roh et al.

(10) Patent No.: US 8,683,819 B2
(45) Date of Patent: Apr. 1, 2014

(54) AIR CONDITIONER USING HOT WATER PROVIDED BY SOLAR HEATING SYSTEM

(76) Inventors: Sang-Woo Roh, Daejeon (KR); Bong-Woo No, Busan (KR)

(*) Notice: Subject to any disclaimer, the term of this patent is extended or adjusted under 35 U.S.C. 154(b) by 212 days.

(21) Appl. No.: 13/390,507

(22) PCT Filed: Aug. 12, 2010

(86) PCT No.: PCT/KR2010/005316
§ 371 (c)(1),
(2), (4) Date: Feb. 14, 2012

(87) PCT Pub. No.: WO2011/019226
PCT Pub. Date: Feb. 17, 2011

(65) Prior Publication Data
US 2012/0137714 A1   Jun. 7, 2012

(30) Foreign Application Priority Data
Aug. 14, 2009   (KR) .................. 10-2009-0075154

(51) Int. Cl.
F25B 27/00   (2006.01)
(52) U.S. Cl.
USPC .......................................... 62/235.1; 62/500
(58) Field of Classification Search
USPC ............. 62/235.1, 236, 500, 191, 324.6, 484; 165/48.2, 63, 908; 126/610, 635
See application file for complete search history.

(56) References Cited

U.S. PATENT DOCUMENTS

| 4,007,776 A | 2/1977 | Alkasab | |
| 4,023,948 A | 5/1977 | Pitts et al. | |
| 4,173,994 A * | 11/1979 | Hiser | 165/48.2 |
| 4,237,863 A * | 12/1980 | Harrison | 126/585 |
| 4,301,662 A * | 11/1981 | Whitnah | 62/238.4 |
| 4,374,467 A * | 2/1983 | Briley | 62/238.1 |
| RE31,321 E * | 7/1983 | Harrison | 126/585 |

(Continued)

FOREIGN PATENT DOCUMENTS

| JP | 54-071847 A | 6/1979 |
| KR | 20-0230604 Y1 | 5/2001 |

OTHER PUBLICATIONS

International Search Report for PCT/KR2010/005316 filed on Aug. 12, 2010.

*Primary Examiner* — Mohammad M Ali

(57) ABSTRACT

The present invention relates to an air conditioner using hot water heated by a solar heating system, the air conditioner comprising: a heater 10 that has a vacuous interior and a plurality of hot water branch pipes 13 immersed in the refrigerant; a condenser 30 connected with the heater 10 through a steam pipe L1; an ejector 20 mounted to the steam pipe L1; a flow regulator 40 installed on the exit side of the condenser 30; a refrigerant return line L2 connected to the flow regulator 40 to return the refrigerant to the heater 10; an evaporator 50 connected to the flow regulator 40 to receive condensate; a first steam supply line L4 connected with the evaporator 50 to supply the evaporated refrigerant to the ejector 20; and a second steam supply line L5 that is branched from the first steam supply line L4 and then connected with the steam pipe L1 and has a vacuum pump P2 installed therein. With the above configuration, the present invention can save energy by performing air conditioning using solar energy that is available in plenty during the summer, and continue air conditioning by maintaining the refrigeration cycle with the help of a built-in vacuum pump even when there is not enough solar energy.

5 Claims, 5 Drawing Sheets

(56) References Cited

U.S. PATENT DOCUMENTS

| | | | |
|---|---|---|---|
| 4,523,437 A * | 6/1985 | Briley | 62/238.4 |
| 5,660,165 A * | 8/1997 | Lannes | 126/641 |
| 5,775,107 A * | 7/1998 | Sparkman | 60/641.8 |
| 2005/0188720 A1 * | 9/2005 | Jansen | 62/500 |

* cited by examiner (a)

(b)

AIR CONDITIONER USING HOT WATER PROVIDED BY SOLAR HEATING SYSTEM

TECHNICAL FIELD

The present invention relates to an air conditioner using hot water provided by a solar heating system, and particularly, to an air conditioner using hot water provided by a solar heating system, which can save energy by performing air conditioning using hot water heated by solar energy that is available in plenty during the summer, and also can continue air conditioning with the help of a built-in vacuum pump even when there is not enough solar energy.

BACKGROUND ART

In general, a solar collector which uses solar energy is known widely. In the solar collector, hot water is produced by heating water using collected solar energy, and the produced hot water is mainly used for heat. Since the demand for heat is relatively small during the summer, collected energy is not completely used and thus frequently abandoned.

In order to efficiently utilize the solar energy, there was proposed an absorption refrigerator, for example, which is disclosed in Korean U.M. Registration No. 0230604 (entitled "an absorption refrigerator using solar heat").

As shown in FIG. 1, the absorption refrigerator using solar heat comprises a solar heat collecting device 210 including a solar tracker and an absorption cooling system consisting of an evaporator 100, absorber 110, a pump 120, a heat exchanger 130, a generator 140, a separator 150, a rectifier 160, a condenser 170, a liquid receiver 180, a pressure reducing valve 190 and an expansion valve 200; and a solar heat boiler which heats water using energy collected in the solar heat collecting device 210.

However, since the absorption refrigerator using solar heat has a large size, it has limitation in its installation space. Further, it is too expensive to be used in a home refrigerator.

DISCLOSURE

Technical Problem

An object of the present invention is to provide an air conditioner using hot water provided by a solar heating system, which has no limitation its installation space due to its simple structure, and also which can save energy by performing air conditioning using hot water heated by solar energy that is available in plenty during the summer, and also can continue air conditioning with the help of a built-in vacuum pump even when there is not enough solar energy.

Technical Solution

To achieve the object of the present invention, the present invention provides an air conditioner using hot water provided by a solar heating system, including a heater 10 which is in vacuous state and provided with a plurality of hot water branch pipes 13 immersed in refrigerant; a condenser 30 which is connected with the heater 10 through a steam pipe L1; an ejector 20 which is mounted to the steam pipe L1; a flow regulator 40 which is installed on an outlet side of the condenser 30; a refrigerant return line L2 which is connected to the flow regulator 40 to return the refrigerant to the heater 10; an evaporator 50 which is connected to the flow regulator 40 to receive condensate; a first steam supply line L4 which is connected with the evaporator 50 to supply the evaporated refrigerant to the ejector 20; and a second steam supply line L5 which is branched from the first steam supply line L4 and then connected with the steam pipe L1 and has a vacuum pump P2 installed therein.

Advantageous Effects

According to the present invention as described above, it is possible to save energy by performing air conditioning using hot water heated by solar energy that is available in plenty during the summer, and also to continue air conditioning with the help of a built-in vacuum pump even when there is not enough solar energy.

DESCRIPTION OF DRAWINGS

The above and other objects, features and advantages of the present invention will become apparent from the following description of preferred embodiments given in conjunction with the accompanying drawings, in which.

BEST MODE

Hereinafter, the embodiments of the present invention will be described in detail with reference to accompanying drawings.

Figure 1:
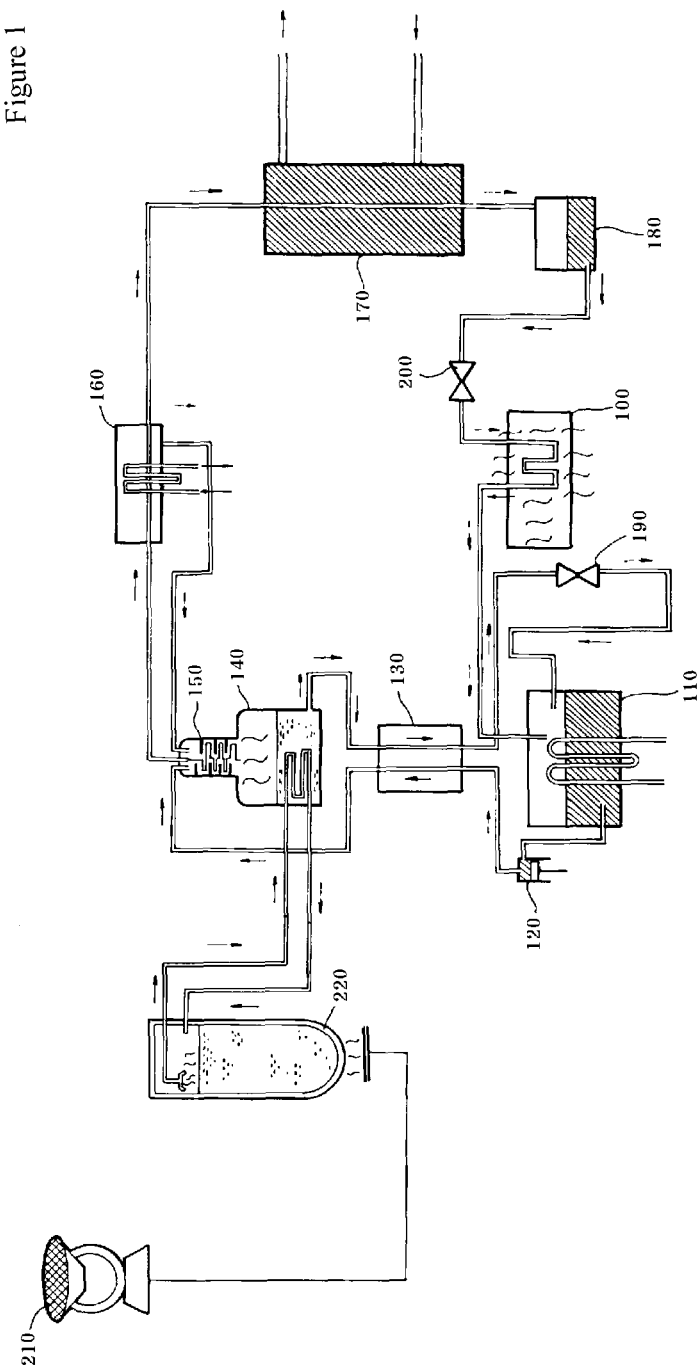
FIG. 1 is a view showing a configuration example of a conventional absorption refrigerator using solar heat.
Figure 2:
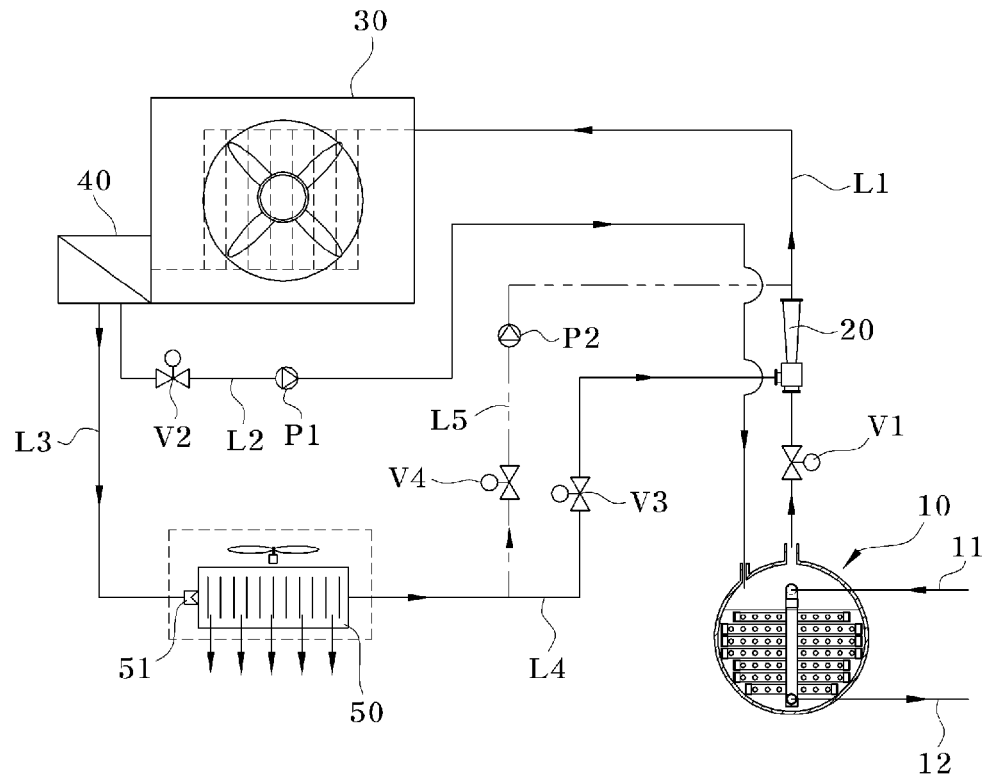
FIG. 2 is a view showing a configuration example of an air conditioner using hot water provided by a solar heating system according to the present invention.

FIG. 2 is a view showing a configuration example of an air conditioner using hot water provided by a solar heating system according to the present invention. As shown in FIG. 2, the present invention includes a heater 10, a condenser 30, a flow regulator 40 and an evaporator 50. An ejector is disposed between the heater 10 and the condenser 30, and a vacuum pump P2 is disposed at a cooling line branched from the outlet side of the evaporator 50.

The heater 10 receives a heat source (hot water) from a boiler for heating water using energy collected from a solar collector (not shown) and heats refrigerant received therein so as to generate steam.

Figure 3:
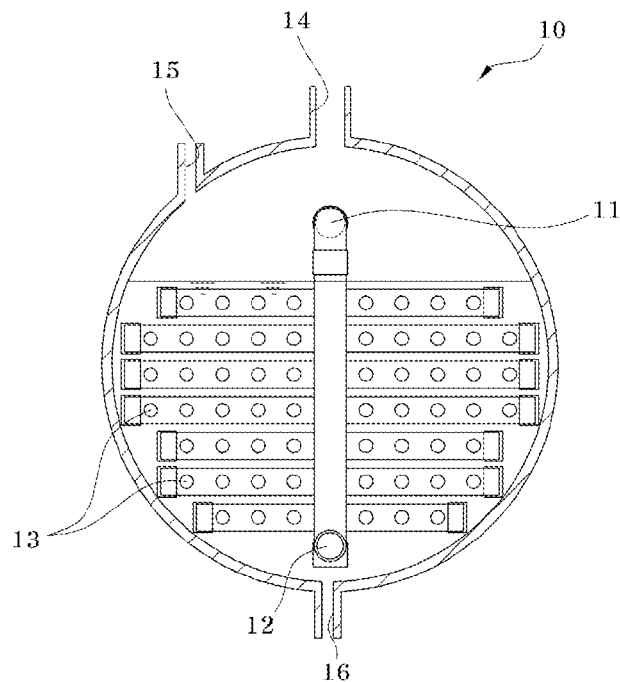
FIGS. 3 and 4 are cross-sectional views of a heater according to the present invention.
Figure 4:
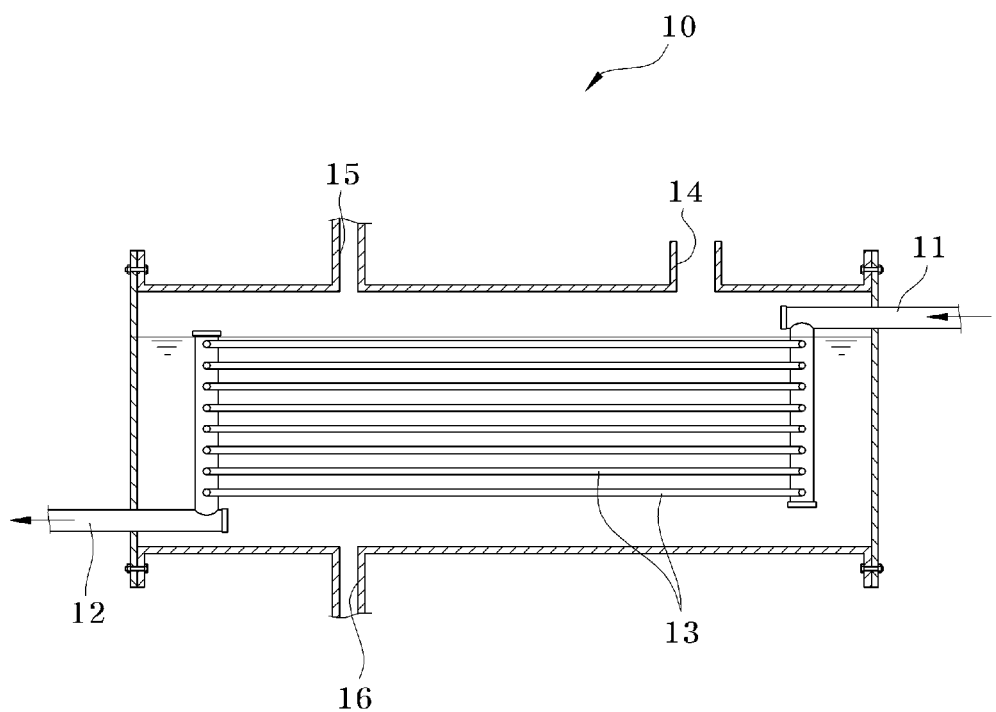

As shown in FIGS. 3 and 4, a hot water inlet pipe 11 and a hot water outlet pipe 12 are provided at both ends of the heater 10 so that the hot water can be flowed therein maintained in vacuum state, and a plurality of hot water branch pipes 13 which are immersed in the refrigerant are connected between the hot water inlet pipe 11 and the hot water outlet pipe 12.

In the heater 10, the hot water heated by solar heat is introduced through the hot water inlet pipe 11 so as to perform heat exchange with the refrigerant received therein while flowing along the plurality of hot water branch pipes 13, and the cooled water is returned to the solar heat boiler through the hot water outlet pipe 12.

The refrigerant heated by heat exchange with the heated hot water branch pipes 13 is evaporated and discharged along a steam pipe L1 through a steam outlet port 14 disposed at the upper side of the heater 10. Herein, since the heater 10 is in vacuum state, the refrigerant is easily evaporated.

Meanwhile, the heater 10 includes a condensate inlet port 15 for recovering condensate supplied to the condenser 30 and the evaporator 50, and an air outlet port 16 for picking up air which may be remained in the heater 10.

High pressure refrigerant steam which is heated and gasified by the heater 10 is supplied to the condenser 30. The condenser 30 is provided with at least one cooling fan. The refrigerant steam is cooled and liquefied by the cooling fan and then flowed through a condensate supply line L3 to the evaporator 50.

Generally, the solar collector is provided with a cooling system in order to prevent overheat. However, since the present invention uses hot water, the cooling system is not needed to cool the solar collector. Thus, since electric energy to be supplied to the cooling system can be used as power for driving the cooling fan of the condenser 30, it is possible to save energy.

The ejector 20 is disposed at the steam pipe L1 that connects the heater 10 with the condenser 30. In the ejector 20, steam, air, water or the like having desired pressure is passed through a narrow nozzle so as to form lower pressure than the surroundings, and thus the steam or water can be sucked through a pipe connected to a side surface of the nozzle due to the low pressure state thereof.

According to the present invention, the ejector 20 is disposed at the outlet side of the heater 10 and the steam pipe L1 that connects the condenser 30, and the gasified refrigerant passed through the evaporator 50 is flowed to a side surface of the ejector 20. Therefore, the high pressure and high temperature steam generated by the heater 10 is rapidly flowed through the ejector 20 before being supplied to the condenser 30. In this process, the ejector 20 is in vacuum state, and thus the gasified refrigerant passed through the evaporator 50 is sucked therein and then supplied to the condenser 30 together with the high pressure and high temperature refrigerant steam.

In other words, the refrigerant is circulated by impellent force (vacuum suction force) which is generated by passing the high pressure and high temperature steam through the ejector 20, and thus a constant amount of refrigerant is always collected or resupplied to the heater 10 through a refrigerant return line L2 to be described later.

The high pressure and high temperature steam generated by the heater 10 and the evaporator 50 to be described later is cooled by the condenser 30 which is connected to the downstream side of the ejector 20 through the steam pipe L1. Herein, the condenser 30 used in the present invention is a water cooled condenser which has high cooling efficiency by rapidly cooling the refrigerant and also allows the refrigerant to be flowed smoothly. The water cooled condenser 30 is known widely and thus description thereof will be omitted.

The flow regulator 40 which is disposed at the downstream side of the condenser 30 functions to supply part of the refrigerant condensed by the condenser 30 to the evaporator 50 and also to return the rest thereof to the heater 10, and thus evaporation of the refrigerant occurs continuously in the heater 10. And the evaporated refrigerant generates the impellent force while again passing through the ejector 20, and the refrigerant is circulated continuously in the system.

Figure 5:
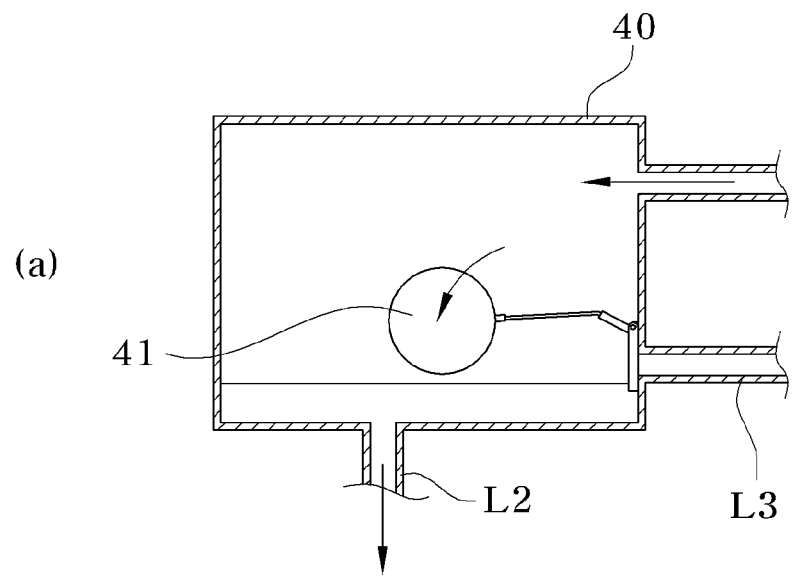
FIGS. 5a and 5b are cross-sectional views of a flow regulator according to the present invention.
Figure 5:
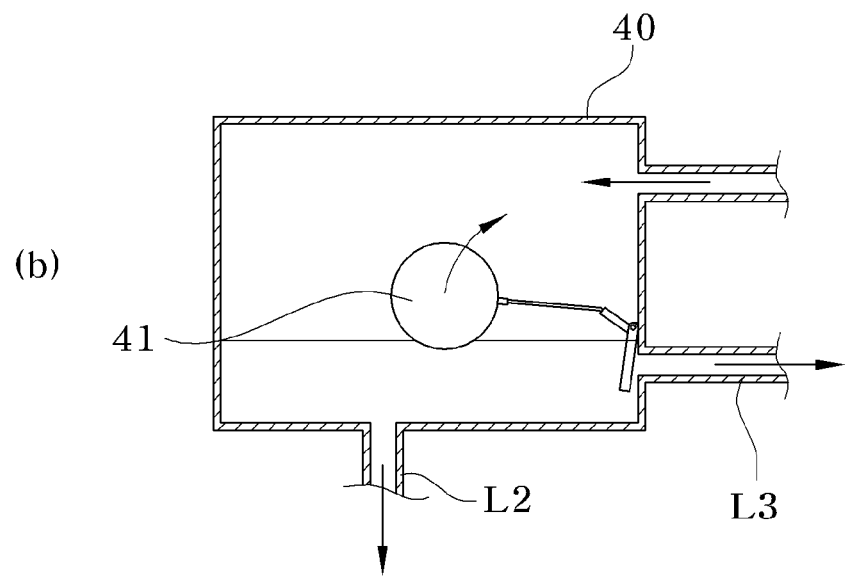

As shown in FIG. 5a, the flow regulator 40 is formed into a box shape which has a proper size so as to store the condensate. The condensate supply line L3 is provided at a lower portion of the flow regulator 40 so as to be connected to the evaporator 50, and the refrigerant return line L2 that is opened or closed by a switchgear 41 according to a condensate level is connected to a side surface of the flow regulator.

In the condenser 30 as described above, if the condensate is initially supplied to the flow regulator 40, the condensate is supplied to the evaporator 50 through the condensate supply line L3. Herein, if an amount of the condensate evaporated through the evaporator 50 is too small, or an amount of the condensate flowed to the evaporator 50 is too great, the condensate is accumulated in the flow regulator 40, and thus the condensate level rises.

If the condensate is accumulated in the flow regulator 40 and thus the condensate level rises, the refrigerant return line L2 is opened by the switchgear 41, and the refrigerant is flowed to the heater 10 through the refrigerant return line L2.

By such configuration, it is prevented that the refrigerant steam which is not yet condensed by the condenser 30 is flowed into the refrigerant return line L2, and it is also prevented that the gasified steam is introduced into a pump P1 which is provided to facilely recover the condensate, thereby damaging the pump P1.

The evaporator 50 that is connected with the flow regulator 40 through the condensate supply line L3 performs air-conditioning through heat exchange with air. An orifice 51 is formed at an entrance end of the evaporator 50 so that the refrigerant condensate is expanded and flowed in the evaporator 50, thereby performing the air-conditioning.

If the refrigerant in the evaporator 50 is evaporated during the air-conditioning, the refrigerant steam is supplied again to the ejector 20 through a first steam supply line L4. Herein, the refrigerant steam is supplied again to the condenser 30 through the steam pipe L1 by the impellent force generated when the high pressure and high temperature steam generated from the heater 10 is passed through the ejector 20. Therefore, the refrigerant is circulated while maintaining the refrigeration cycle.

Meanwhile, in order to prepare for a case that solar energy is supplied poorly like in the rainy season, a second steam supply line L5 is branched from the first steam supply line L4, and a rear end of the second steam supply line L5 is connected to the downstream of the ejector 20 of the steam pipe L1, and the vacuum pump P2 is disposed at the second steam supply line L5 so that the refrigerant steam discharged from the evaporator 50 is directly supplied to the condenser 30 without passing through the ejector 20, thereby forming the refrigeration cycle. Therefore, it is possible to continue the air conditioning even in the rainy season.

To this end, an automatic valve V1, V2, V3, V4 is installed at the steam pipe L1, the refrigerant return line L2 and the first and second steam supply lines L4 and L5 so as to be selectively opened and closed as occasion demands, such that the refrigerant steam is selectively flowed through one of the first and second steam supply lines L4 and L5.

Hereinafter, a method of operating the air conditioner using one of the first and second steam supply lines L4 and L5 will be described.

EMBODIMENT

Figure 6:
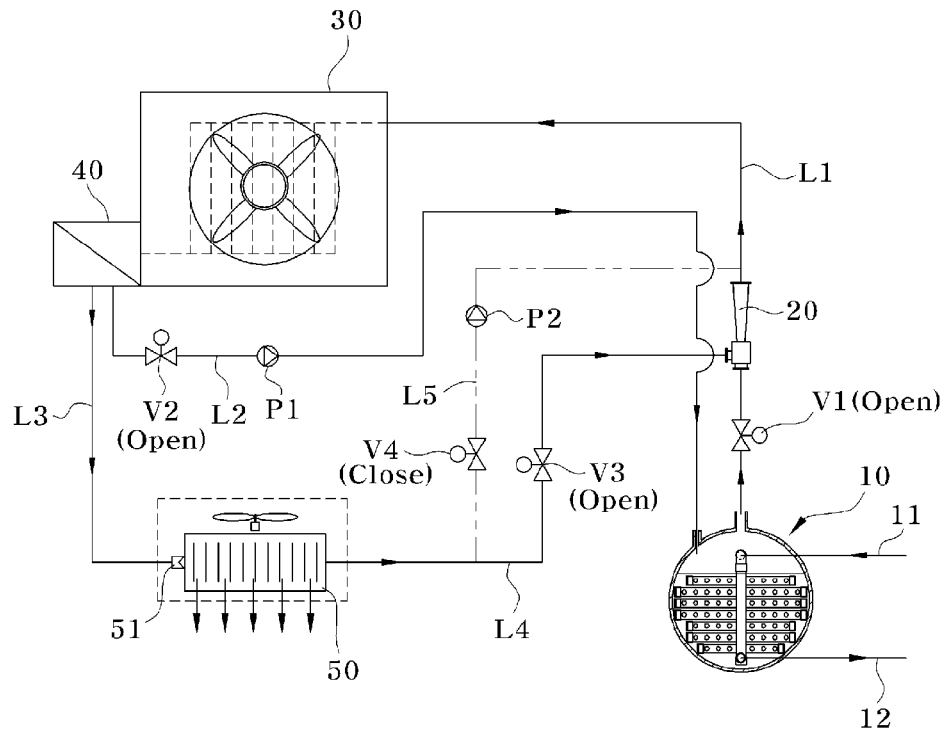
FIGS. 6 and 7 are views showing an operation state of the air conditioner using hot water provided by the solar heating system according to the present invention.

The first steam supply line L4 is used when the solar heat is supplied sufficiently. Herein, as shown in FIG. 6, the automatic valves V1, V2 and V3 are opened and the automatic valve V4 is closed.

By the opening and closing operation of the automatic valves, the hot water heated by the solar energy heats the refrigerant in the heater 10, and thus the refrigerant is evaporated and transformed into the high pressure and high temperature refrigerant steam, and the high pressure and high temperature refrigerant steam is supplied to the condenser 30 through the steam pipe L1 and the ejector 20.

The high pressure and high temperature refrigerant steam supplied to the condenser 30 is rapidly cooled by the water cooled condenser 30, transformed into lower pressure and low temperature condensate and then supplied to the flow regulator 40.

Part of the refrigerant supplied to the flow regulator 40 is supplied to the evaporator 50, and the rest thereof is returned to the heater 10 through the refrigerant return line L2, thereby repeating the process that the refrigerant is evaporated again in the heater 10 and supplied to the condenser 30.

Meanwhile, the liquefied refrigerant supplied to the evaporator 50 by the flow regulator 40 performs the air-conditioning by heat exchange with the surroundings.

The refrigerant in the evaporator 50 is transformed into steam due to the heat exchange with air, and the refrigerant steam is connected to the side surface of the ejector 20 along the first steam supply line L4, sucked into the ejector 20 due to the vacuum state generated by the impellent force that injects the refrigerant steam generated from the heater 10, and then resupplied to the condenser 30 through the steam pipe L1. This process is repeated.

Figure 7:
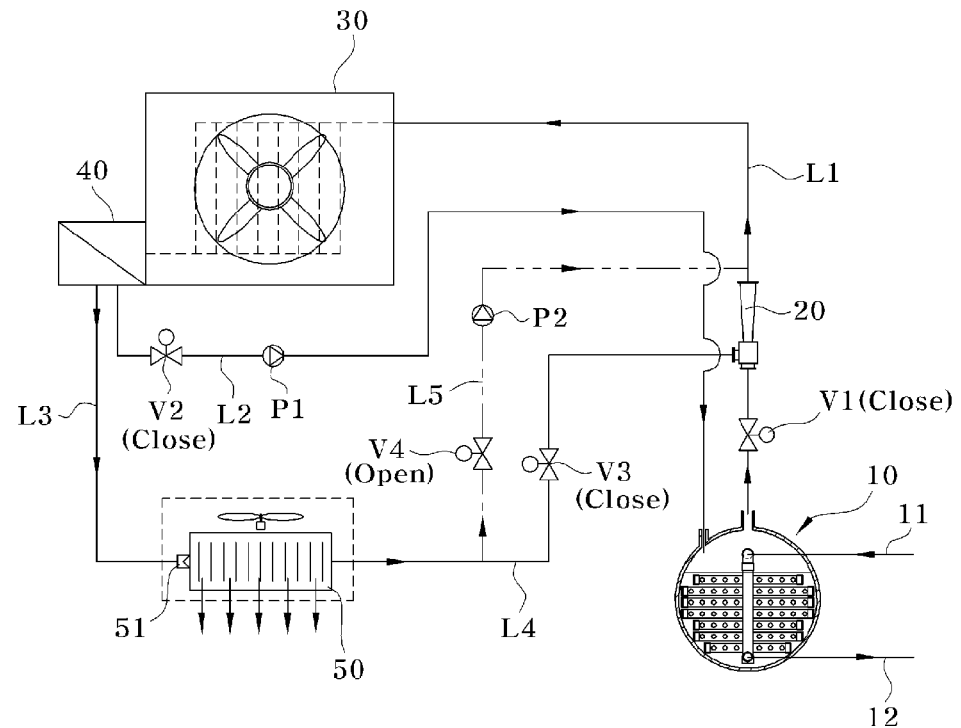

Meanwhile, the second steam supply line L5 is used when the solar heat is supplied insufficiently, like in the rainy season. Herein, as shown in FIG. 7, the automatic valves V1, V2 and V3 are closed and the automatic valve V4 is opened.

By the opening and closing operation of the automatic valves, the supply of refrigerant from the heater 10 is blocked. The refrigerant steam discharged from the evaporator 50 is supplied again to the condenser 30 by the vacuum pump P2 disposed at the second steam supply line L5, thereby maintaining the refrigeration cycle and thus performing the air-conditioning.

INDUSTRIAL APPLICABILITY

According to the present invention as described above, the air-conditioning can be performed even when the solar energy is not enough to perform the air-conditioning.

While the present invention has been described with respect to the specific embodiments, it will be apparent to those skilled in the art that various changes and modifications may be made without departing from the spirit and scope of the invention as defined in the following claims.

The invention claimed is:

1. An air conditioner using hot water provided by a solar heating system, comprising:
   a heater 10 which is in vacuous state and provided with a plurality of hot water branch pipes 13 immersed in refrigerant;
   a condenser 30 which is connected with the heater 10 through a steam pipe L1;
   an ejector 20 which is mounted to the steam pipe L1;
   a flow regulator 40 which is installed on an outlet side of the condenser 30;
   a refrigerant return line L2 which is connected to the flow regulator 40 to return the refrigerant to the heater 10;
   an evaporator 50 which is connected to the flow regulator 40 to receive condensate;
   a first steam supply line L4 which is connected with the evaporator 50 to supply the evaporated refrigerant to the ejector 20; and
   a second steam supply line L5 which is branched from the first steam supply line L4 and then connected with the steam pipe L1 and has a vacuum pump P2 installed therein.

2. The air conditioner according to claim 1, wherein an automatic valve V1, V2, V3, V4 is installed at the steam pipe L1, the refrigerant return line L2 and the first and second steam supply lines L4 and L5.

3. The air conditioner according to claim 1, wherein a pump P1 is installed at the refrigerant return line L2 so as to facilely return the condensate.

4. The air conditioner according to claim 1, wherein an orifice 51 is formed at an entrance end of the evaporator 50.

5. The air conditioner according to claim 2, wherein the automatic valves V1, V2 and V3 are opened and the automatic valve V4 is closed, when the hot water heated by solar heat is used, and the automatic valves V1, V2 and V3 are closed and the automatic valve V4 is opened, when the hot water heated by solar heat is not used.

* * * * *